(12) United States Patent
Yin

(10) Patent No.: US 6,219,728 B1
(45) Date of Patent: *Apr. 17, 2001

(54) METHOD AND APPARATUS FOR ALLOCATING SHARED MEMORY RESOURCES AMONG A PLURALITY OF QUEUES EACH HAVING A THRESHOLD VALUE THEREFOR

(75) Inventor: Nanying Yin, Newton, MA (US)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/635,482

(22) Filed: Apr. 22, 1996

(51) Int. Cl.[7] ............................ H04L 12/26; H04L 12/56; G06F 13/14; G06F 13/16

(52) U.S. Cl. ............................ 710/52; 709/104; 709/235; 709/213; 709/232; 710/56; 710/57; 710/53; 710/54; 370/412; 370/229; 370/236; 711/100

(58) Field of Search ........................ 395/200.65; 370/412, 370/229, 236; 710/56, 57, 53, 54, 52; 709/104, 235, 213, 232; 711/100

(56) References Cited

U.S. PATENT DOCUMENTS

| | | |
|---|---|---|
| 4,769,811 | 9/1988 | Eckberg, Jr. et al. ............... 370/60 |
| 4,953,157 | 8/1990 | Franklin et al. .................... 370/60 |
| 5,231,633 | 7/1993 | Hluchyj et al. .................... 370/94.1 |
| 5,541,912 * | 7/1996 | Choudhury et al. ............... 370/412 |
| 5,704,047 * | 12/1997 | Schneeberger ................. 395/200.65 |

OTHER PUBLICATIONS

Kamoun et al, Analysis of Shared Finite Storage in a Computer Network Node Environment Under General Traffic Conditions, IEEE Transactions on Communications, vol. Com–28, No. 7, pp. 992–1003, Jul. 1980.

Yin et al, Congestion Control for Packet Voice by Selective Packet Discarding, IEEE Transactions on Communications, vol. 38, No. 5, pp. 674–683, May 1990.

Choudhury et al, Space Priority Management in a Shared Memory ATM Switch, IEEE GLOBECOM '93 Proceedings vol. 3 (Houston, Texas), pp. 1375–1383, Dec. 1993.

Choudhury et al, Dynamic Queue Length Thresholds in a Shared Memory ATM Switch, IEEE INFOCOM '96 Proceedings vol. 2 (San Francisco, California), pp. 679–687, Mar. 24, 1996.

Traffic Management Specification v4.0, The ATM Forum Technical Committee, af–tm–0056.000 Letter Ballot, Apr. 1996.

* cited by examiner

Primary Examiner—Thomas Lee
Assistant Examiner—Katharina Schuster
(74) Attorney, Agent, or Firm—Blakely Sokoloff Taylor & Zafman LLP

(57) ABSTRACT

A system for allocating shared memory resources among a plurality of queues and discarding incoming data as necessary. The shared memory resources are monitored to determine a number of available memory buffers in the shared memory. A threshold value is generated for each queue indicating a maximum amount of data to be stored in the associated queue. Threshold values are updated in response to changes in the number of available memory buffers.

17 Claims, 10 Drawing Sheets

METHOD AND APPARATUS FOR ALLOCATING SHARED MEMORY RESOURCES AMONG A PLURALITY OF QUEUES EACH HAVING A THRESHOLD VALUE THEREFOR

BACKGROUND OF THE INVENTION

1. Field of the Invention

The present invention relates to management of memory resources. More specifically, a method and apparatus for allocating shared memory resources and discarding incoming data as necessary.

2. Background

In a network environment, various traffic management techniques are used to control the flow of data throughout the network. Network devices often utilize buffers and queues to control the flow of network data. During periods of heavy network traffic or congestion, certain data cells or packets may be discarded to prevent buffer overflow or deadlock.

FIG. 1 illustrates a known switch 10 for use in a network environment. Switch 10 receives data cells from a plurality of input ports (labeled $IN_1-IN_M$) and transmits data cells from a plurality of output ports (labeled $OUT_1-OUT_N$). A plurality of input buffers 12 are coupled between the input ports and switch 10. A plurality of output buffers 14 are coupled between switch 10 and the output ports. As shown in FIG. 1, each input buffer 12 is separated from the remaining input buffers and dedicated to a particular port of switch 10. If a particular port is not active, then its associated input buffer cannot be used by another port. Instead, the buffer remains idle even if other buffers are fully utilized. For example, if the input buffer associated with input $IN_1$ is full and the input buffer associated with $IN_2$ is empty, incoming data on input $IN_1$ will be discarded, and cannot be stored in the input buffer associated with $IN_2$. Similarly, each output buffer 14 is separated from the remaining output buffers and dedicated to a particular output line.

To provide improved memory utilization, another type of network switch was developed having a shared memory buffer. An example of a shared memory switch is illustrated in FIG. 2. Shared memory switch 100 includes a plurality of inputs and a plurality of outputs. Rather than providing separate input buffers for each input, shared memory switch 100 includes a shared memory 102 which receives data cells or packets from any of the inputs.

When using a shared memory device, the memory resources must be allocated between the various ports coupled to the shared memory. Known switches utilize fixed discard thresholds for determining when to discard an incoming or outgoing data cell or packet. Thus, when the level of data associated with a particular port exceeds a fixed threshold value, the data cell or packet is discarded. Although a shared memory switch allows multiple ports to share a single memory buffer, the use of fixed thresholds for discarding data creates several problems.

If a single port is active, the port is limited by its fixed threshold. Thus, instead of utilizing the entire memory buffer, the memory usage by the single active port may not exceed the fixed threshold value. When the threshold value is reached, additional incoming cells must be discarded rather than being stored in the empty portions of the memory buffer. This results in an under-utilization of the memory buffer resources.

Another problem created by fixed thresholds results in an unequal allocation of memory resources among the various ports. To take advantage of the shared memory buffer, fixed thresholds are typically set higher than the "fair share" of the memory resources for each port. For example, if a shared memory device is accessed by four different ports, the "fair share" for each port is 25% of the available memory resources. However, if the threshold for each port is set at 25% of the total memory available, then the situation is similar to the prior art switch of FIG. 1 having separate memory buffers. In this situation, each switch may utilize a separate portion of the shared memory equal to its fair share. To provide better memory utilization, the fixed thresholds are typically set higher than the port's "fair share" of memory. Problems occur when all ports are active and certain ports use memory resources up to their threshold values. Since the fixed thresholds are set higher than the port's "fair share," overallocation of the memory resources may occur if several ports are active at the same time. This overallocation of memory resources may overload the buffer and cause the buffer to malfunction.

It is therefore desirable to provide a mechanism for managing a shared memory buffer in a manner that efficiently utilizes memory resources and prevents overload and unfair usage of memory resources.

SUMMARY OF THE INVENTION

The present invention provides a method and apparatus for allocating shared memory resources and discarding incoming data as necessary. Adaptive thresholds are provided for each individual queue or port. The adaptive thresholds are adjusted in response to changes in the overall usage of the shared memory resources. As memory usage increases, each threshold value is lowered. When memory usage decreases, each threshold value is increased. The adaptive thresholds of the present invention provide for efficient utilization of memory resources and relatively uniform allocation of memory resources.

An embodiment of the present invention provides a system for allocating shared memory resources among a plurality of queues. The shared memory resources are monitored to determine a number of available memory buffers in the shared memory. Threshold values are generated for each queue indicating the number of data cells to be stored in the associated queue. The threshold values are updated in response to changes in the number of available memory buffers.

Another feature of the invention performs a comparison of the threshold value with the queue usage to determine whether to accept or discard incoming data cells destined for the queue.

An aspect of the invention adjusts threshold values by increasing the threshold value in response to increased available memory and decreasing the threshold value in response to decreased available memory.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those skilled in the art will appreciate that the invention may be practiced without these specific details. In other instances, well known methods, procedures, protocols, components, and circuits have not been described in detail so as not to obscure the invention.

Figure 1:
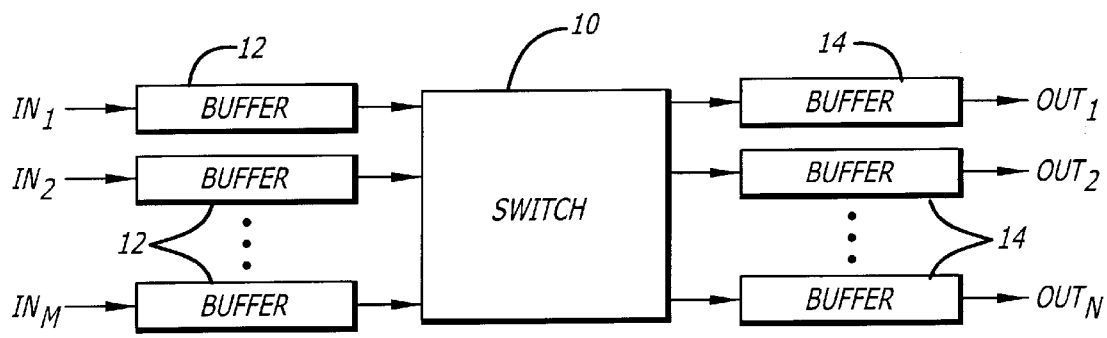
FIG. 1 is a block diagram of a conventional network switch.
Figure 2:
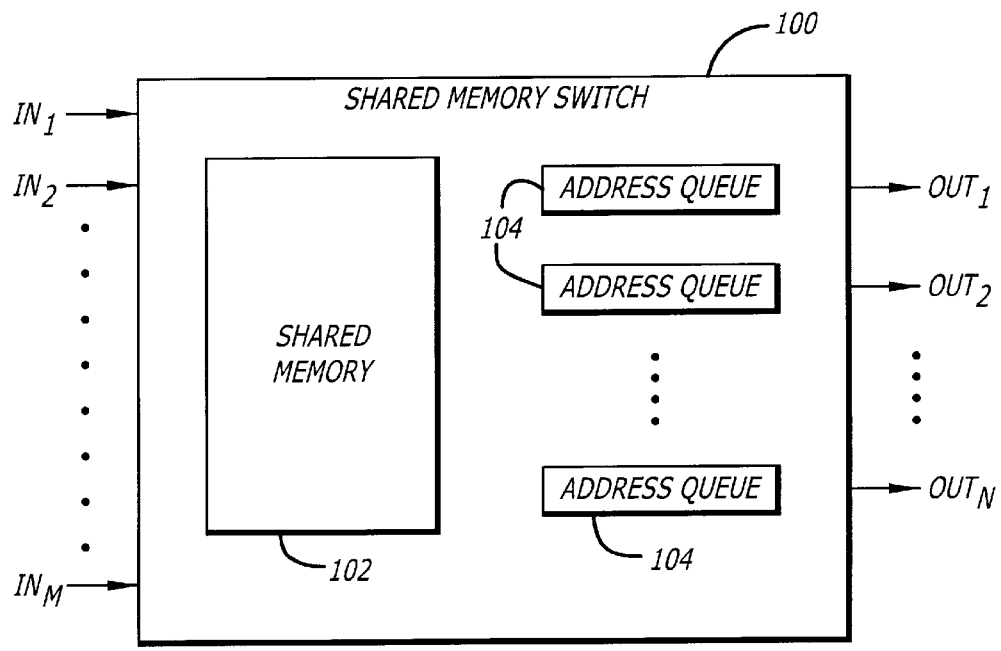
FIG. 2 is block diagram of a shared memory switch capable of implementing the present invention.

The present invention is related to a system for allocating shared memory resources among various ports and discarding incoming or outgoing data cells as necessary. FIG. 2 illustrates a shared memory switch capable of utilizing the present invention. Shared memory switch 100 receives data cells on a plurality of input ports (labeled $IN_1$–$IN_M$) and stores cells in a shared memory 102. Shared memory switch 100 transmits the data cells from shared memory 102 through a plurality of output ports (labeled $OUT_1$–$OUT_N$). Switch 100 may receive data in the form of data cells or other data structures. Those skilled in the art will appreciate that the invention may be utilized with a variety of data structures and data transmission protocols. The term "data cells" is used throughout this specification to refer to any type of data or data structure received by a shared memory switch or other shared memory device. Additionally, the present invention may be used with any shared memory device and is not limited to shared memory switches.

Shared memory 102 may be a random access memory (RAM) or similar memory device containing a plurality of memory buffers or memory locations. The switch illustrated in FIG. 2 is capable of handling Asynchronous Transfer Mode (ATM) data cells and packets. For example, an ATM Adaptation Layer 5 (AAL5) frame may be used in which the packets are segmented into cells. For purposes of illustration, the operation of switch 100 will be described when handling data cells in an ATM shared memory switch. However, those skilled in the art will appreciate that the invention may be utilized in a similar manner for other data formats and protocols.

As shown in FIG. 2, switch 100 includes a plurality of address queues 104. Address queues 104 may be first-in first-out (FIFO) buffers or similar queuing devices. Each address queue 104 is associated with a particular output port of switch 100. However, multiple address queues 104 may be associated with each output port; i.e., each output port may have different queues 104, each providing a different Quality of Service (QOS). For example, different queues may be provided for constant bit rate (CBR) data, variable bit rate (VBR) data, available bit rate (ABR) data, and unspecified bit rate (UBR) data. Additionally, certain queues may be associated with real-time video or audio data and other queues may be associated with computer data packets.

Figure 4:
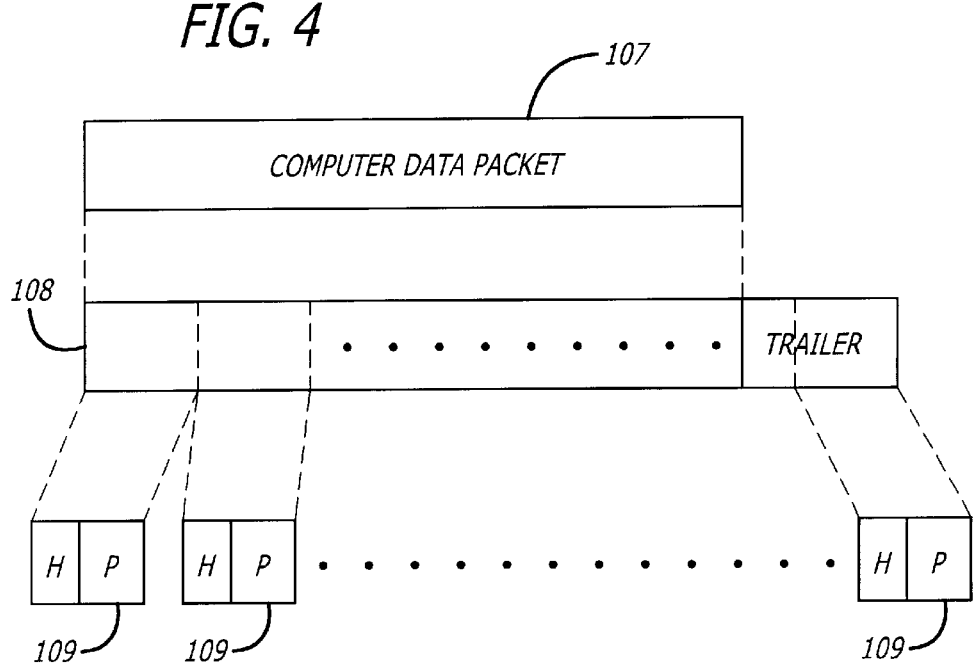
FIG. 4 illustrates an example of a data packet segmented into ATM cells.

FIG. 4 illustrates an exemplary computer data packet 107 segmented into a plurality of ATM cells. An ATM Adaptation Layer 5 (AAL5) frame 108 contains computer data packet 107 and a trailer. AAL5 frame 108 is segmented into a plurality of ATM cells 109, each ATM cell having a header "H" and a payload "P". ATM cells 109 are used for transmission in the cell relay networks. The last ATM cell 109 is used to identify the boundaries of the frame by examining the value in the payload type field of the cell header.

Referring again to FIG. 2, the entries in each address queue 104 point to a particular memory buffer within shared memory 102 where the appropriate data cell can be found. Address queues 104 contain memory addresses related to cell buffer locations in shared memory 102, and do not contain the actual cell data. Thus, when a data cell is received by switch 100, the cell is stored at a particular available cell buffer in shared memory 102. The memory address is then added to the appropriate address queue associated with a particular port, provided that the appropriate address queue is not full. When the cell is removed from the shared memory, the associated address is deleted from the address queue. The use of an address queue is provided as an example. Those skilled in the art will appreciate that the invention may be used without an address queue by maintaining all queue information in the shared memory, or using other known queue structures.

Figure 3:
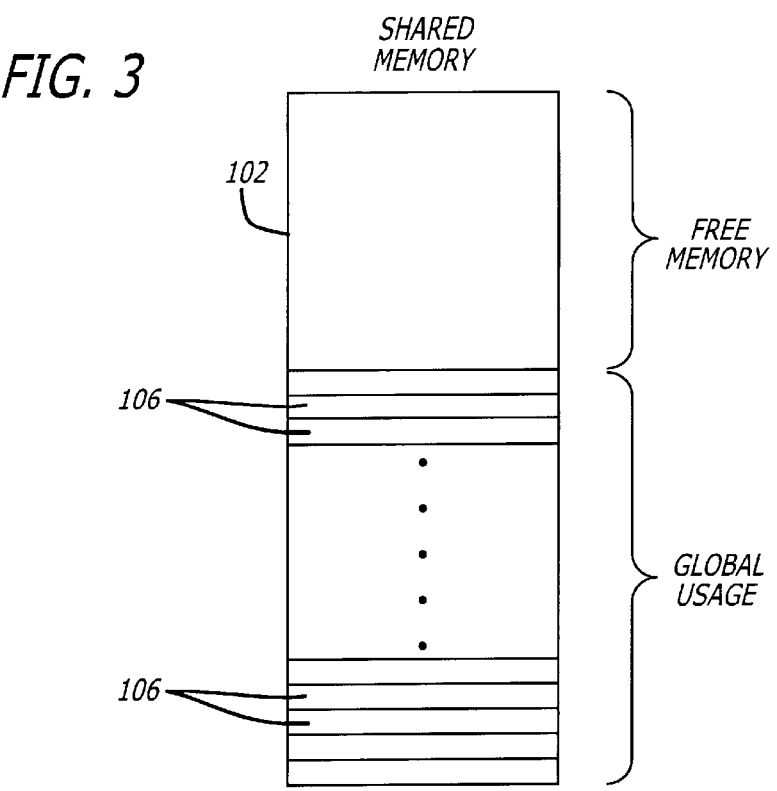
FIG. 3 is a diagram of a shared memory as used in a shared memory switch.

Referring to FIG. 3, shared memory 102 is illustrated having a plurality of data cells 106 stored in the memory buffers. Data cells 106 may be ATM cells, cells of data packets, or any other data structure. Data cells 106 may have been received from different input ports and may be associated with different output ports. The data cells stored in shared memory 102 do not indicate their associated output port or address queue. Instead, as discussed above, each address queue 104 points to a particular address within shared memory 102 where the data cell is located. Therefore, data cells 106 may be added to shared memory 102 in any order because the address queues maintain the necessary ordering for transmission of the data cells. As shown in FIG. 3, a portion of shared memory 102 (labeled Global Usage) is filled with data cells 106 while the remainder of memory 102 (labeled Free Memory) is empty.

Multiple address queues 104 (FIG. 2) share the same memory 102. Discard thresholds are used to efficiently utilize shared memory 102 and provide relatively uniform allocation of the memory resources within memory 102. Each queue has at least one threshold for determining whether to accept or discard incoming data destined for the queue. Each discard threshold is adaptive; i.e., the threshold value is dynamic and updated in response to changes in the usage of shared memory 102. As the overall usage of shared memory 102 increases, the individual discard threshold values are decreased. As the overall usage of shared memory 102 decreases, the individual discard threshold values are increased.

FIGS. 5A–7B illustrate the status of various queues and discard thresholds under different memory usage conditions.

Figure 5A:
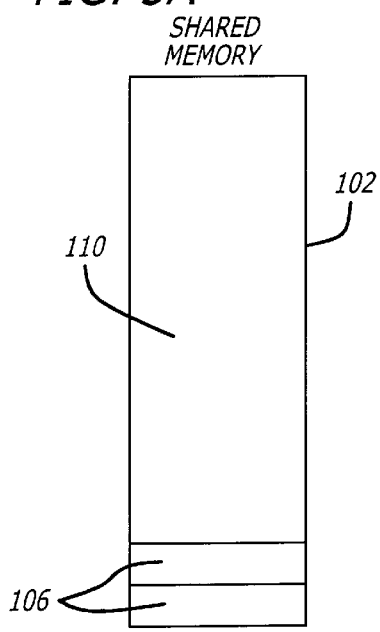
FIGS. 5A–7B illustrate the status of various queues and discard thresholds under different memory usage conditions.
Figure 5B:
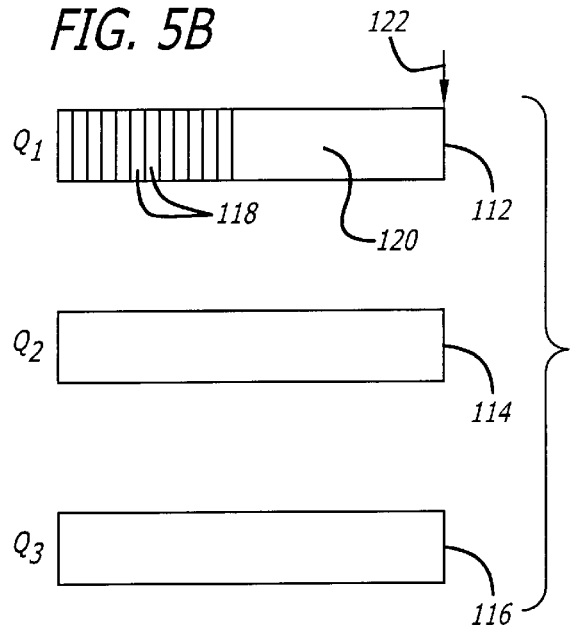

Referring to FIG. 5A, shared memory 102 contains a plurality of data cells 106. A substantial portion of shared memory 102 is available as free memory 110. This condition represents a low usage of shared memory 102. FIG. 5B illustrates three address queues 112, 114, and 116. Address queues 114 and 116 are empty, indicating that the queues are currently inactive. Address queue 112 is active as indicated by a plurality of addresses 118 stored in the queue. Each address 118 indicates a memory address within shared memory 102 containing the actual data cell to be transmitted. Address queue 112 has an unused portion 120 available to receive additional addresses. A discard threshold 122 indicates that the entire memory space is available for use by queue 112. The entire shared memory 102 may be allocated to queue 112 because no other queue is active and, therefore, no other queue requires access to the shared memory. Additional details regarding the calculation of specific threshold values are provided below.

Figure 6A:
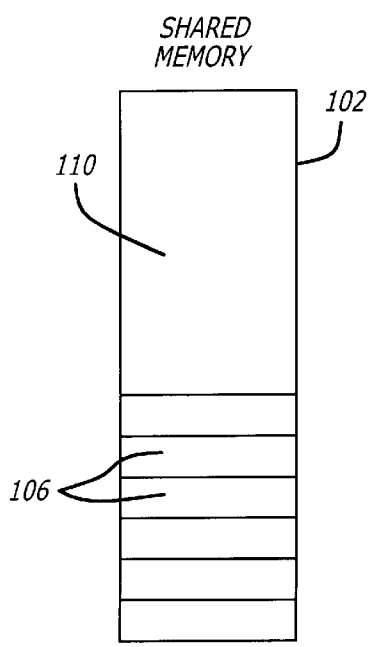
Figure 6B:
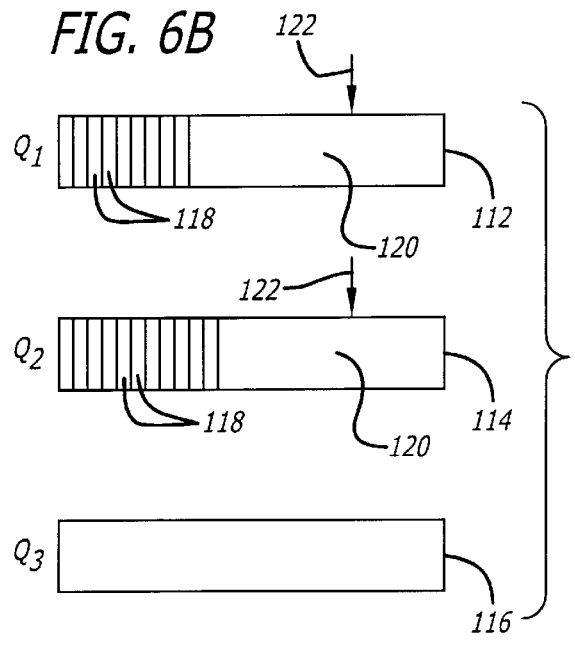

Referring to FIG. 6A, usage of shared memory 102 has increased in comparison to the low usage of FIG. 5A. Accordingly, the available free memory 110 has been reduced. FIG. 6B illustrates two active queues 112 and 114, and one inactive queue 116. The discard threshold 122 for each active queue indicates the maximum number of addresses 118 which may be stored in the queue. Thus, although a queue may be capable of receiving additional addresses 118, the number of addresses stored in a queue may not exceed that queue's discard threshold value. As illustrated in FIG. 6B, each active queue 112 and 114 may receive additional addresses until discard threshold 122 is reached. If the addition of a particular address would exceed discard threshold 122, then the data cell associated with the particular address is discarded. Thus, when a discard threshold has been reached, any additional incoming data cells destined for that queue will be discarded. Preferably, the incoming data cells are discarded before being stored in shared memory 102, thereby conserving memory resources for queued data.

Figure 7A:
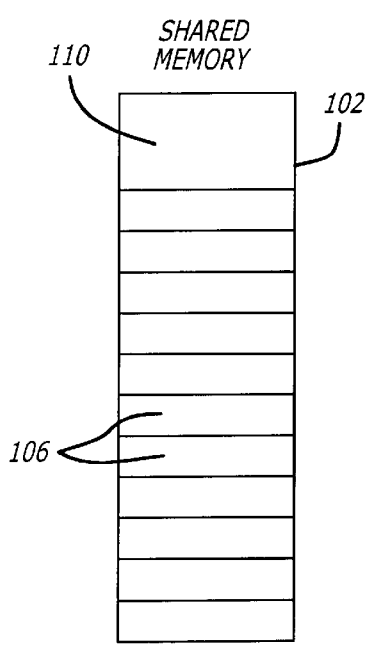
Figure 7B:
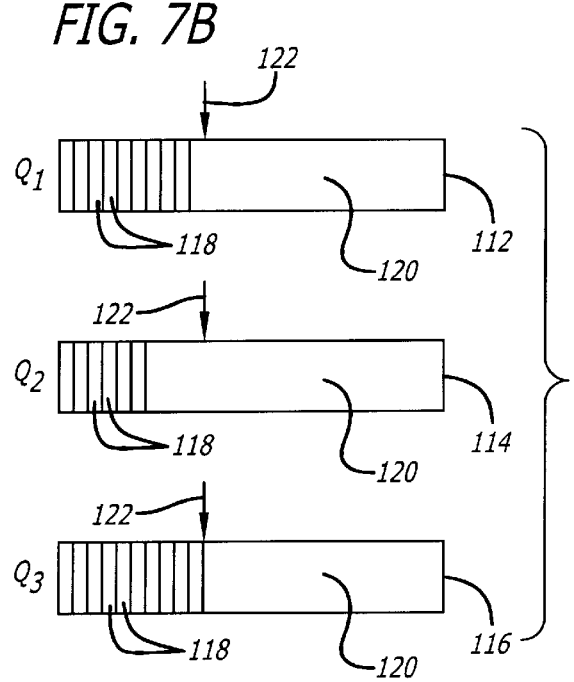

Referring to FIG. 7A, usage of shared memory 102 has further increased in comparison to the usage of FIGS. 5A and 6A. As a result, available free memory 110 has been further reduced. FIG. 7B illustrates three active queues 112, 114, and 116, each containing a plurality of addresses 118. The discard threshold 122 for each active queue indicates the maximum number of addresses 118 which may be received by the queue. Each active queue may continue to receive addresses until the discard threshold 122 has been attained. When a discard threshold has been attained, additional incoming data cells will be discarded. As shown in FIG. 7B, queues 112 and 114 may receive additional addresses 118 because the discard thresholds 122 have not been reached. However, queue 116 cannot receive additional addresses because the number of addresses stored in the queue has reached the threshold value. Therefore, any incoming data cells destined for queue 116 will be discarded.

During operation, addresses 118 are removed from active queues when the corresponding data cells are transmitted from shared memory 102. Removal of one or more addresses 118 permits the addition of new incoming data cells destined for the queue. Additionally, if an active queue becomes inactive, discard thresholds for the remaining active queues may be adjusted, thereby permitting new incoming data cells to be added to the shared memory and their associated addresses added to the appropriate address queue.

FIGS. 5A–7B are provided to illustrate an example of adjustments to discard thresholds based on changing memory usage conditions. The size of the shared memory and the number of queues has been reduced to simplify the illustrations. The above example assumes that all active queues are of equal priority. Accordingly, all discard thresholds are equal to one another. Alternatively, the address queues may have different QOS requirements. For example, queues for cells of computer data packets may be given a higher threshold value and permitted to use a larger portion of the shared memory, while queues for real-time data cells or CBR cells are given lower threshold values and a smaller portion of the shared memory. This configuration reduces the delay associated with real-time or CBR cells because fewer addresses can be stored in the address queue, thereby causing the stored addresses to move through the queue quickly.

Figure 8A:
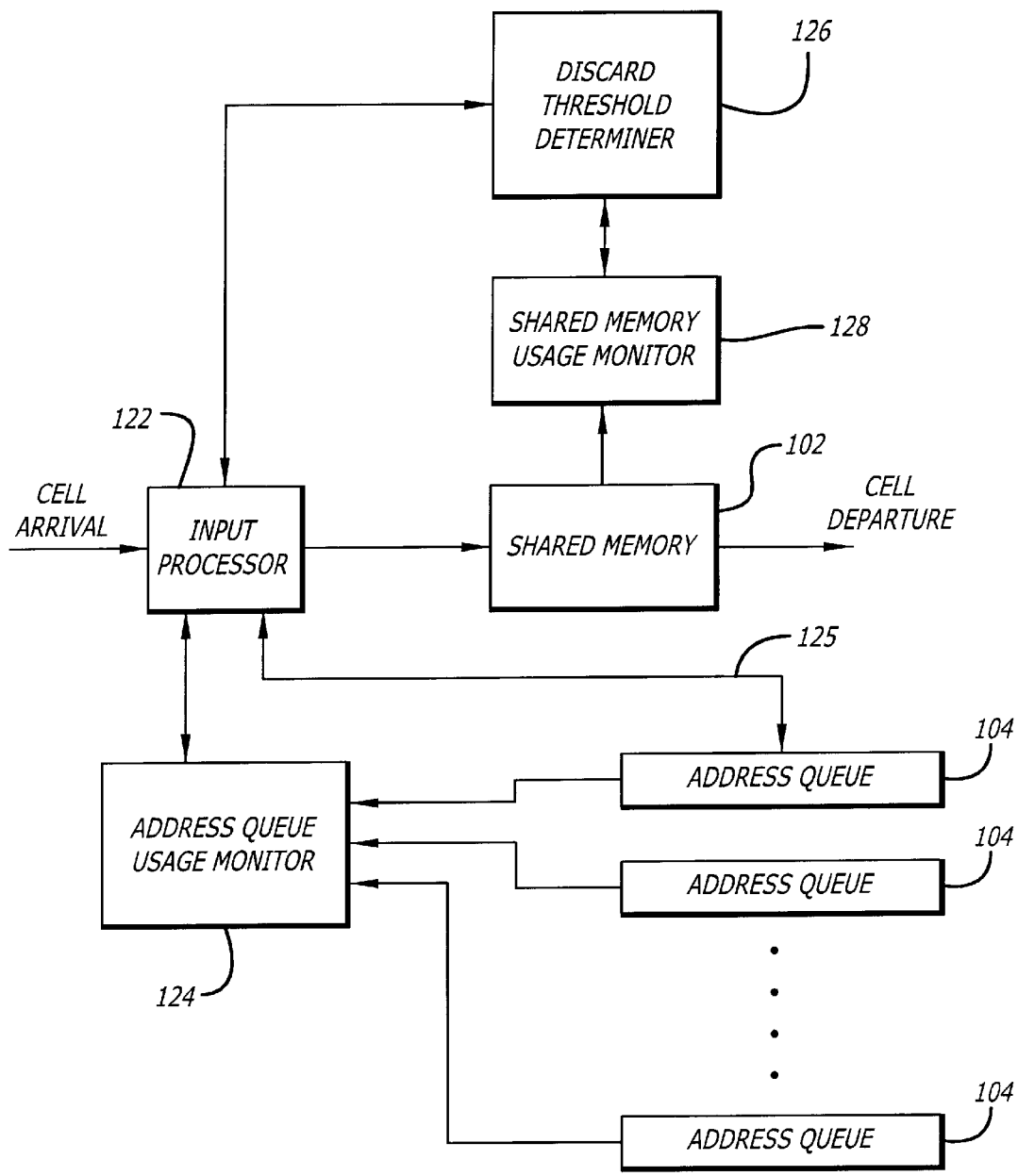
FIGS. 8A illustrates a portion of the shared memory switch shown in FIG. 2.

FIG. 8A illustrates a portion of the shared memory switch shown in FIG. 2. FIG. 8A illustrates an input processor 122 for receiving incoming (arriving) data cells. Input processor 122 determines whether to discard the incoming data cell or store the data cell in shared memory 102 and add the address to the appropriate address queue 104. A signal line 125 couples input processor 122 to address queues 104. Although only one line 125 is shown in FIG. 8A, a separate line 125 (or a signal bus) is used to couple input processor 122 to each address queue 104.

An address queue usage monitor 124 is coupled to input processor 122 and address queues 104. Monitor 124 monitors each address queue 104 to determine address queue usage. Queue usage information is communicated from monitor 124 to input processor 122 for use in determining whether additional addresses may be added to a particular address queue. A shared memory usage monitor 128 is coupled to shared memory 102 and monitors the memory usage to determine the number of available or unused memory buffers. A discard threshold determiner 126 is coupled to shared memory usage monitor 128 and input processor 122. Discard threshold determiner 126 determines one or more discard thresholds for each address queue 104 based on information received from monitor 128 regarding shared memory usage.

Figure 8B:
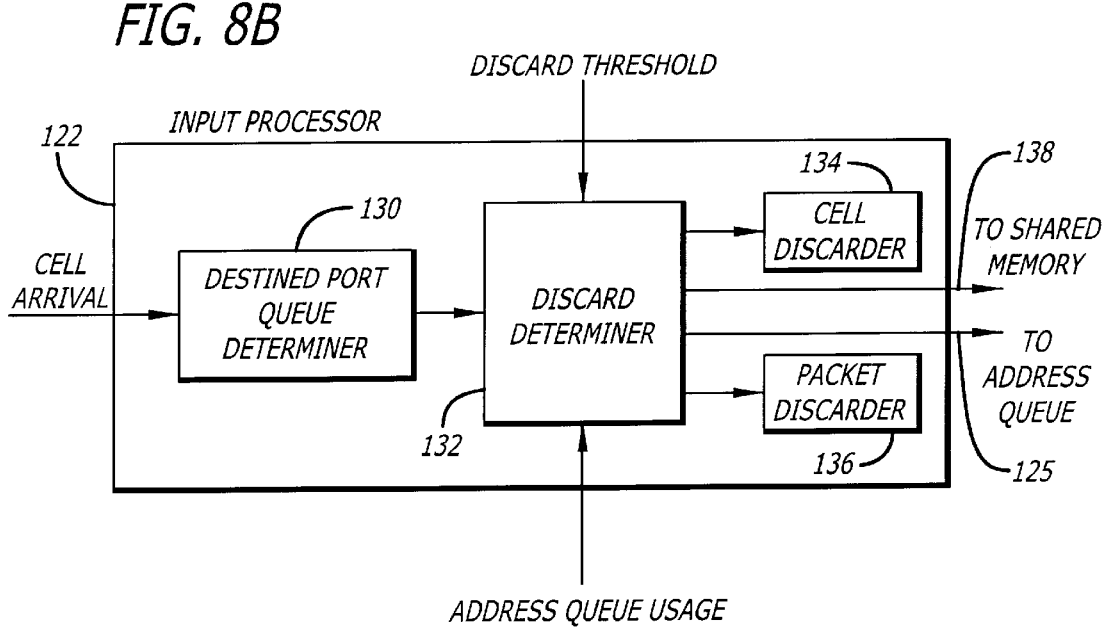
FIG. 8B is a block diagram of the input processor shown in FIG. 8A.

Referring to FIG. 8B, a block diagram of input processor 122 is illustrated. An incoming data cell is received by a destined port queue determiner 130 for determining the destination output port and address queue for the incoming data cell. When using ATM cells, the destination output port and address queue are determined from information contained in the ATM cell header. Based on the type of data cell and type of information contained in the cell, each address queue uses either a cell discard mechanism or a packet discard mechanism. For example, queues for use with computer data may use a packet discard mechanism, whereas queues for use with audio or video data may use a cell discard mechanism.

Destined port queue determiner 130 provides output port and address queue information to a discard determiner 132. Discard determiner 132 determines whether to add the incoming data cell to shared memory 102, perform a cell discard, or perform a packet discard. Discard determiner 132 receives discard threshold information from discard threshold determiner 126 (FIG. 8A) and receives information regarding address queue usage from address queue usage monitor 124 (FIG. 8A). If the incoming data cell is to be discarded, a signal is provided from discard determiner 132 to cell discarder 134 indicating a cell discard operation. If the entire packet is to be discarded, discard determiner 132 provides a signal to packet discarder 136 indicating an entire packet discard operation. If the incoming data cell is to be accepted, discard determiner 132 transfers the incoming data cell to shared memory 102 on line 138, and transfers the memory address where the data cell is stored to the appropriate address queue 104 on line 125.

Figure 8C:
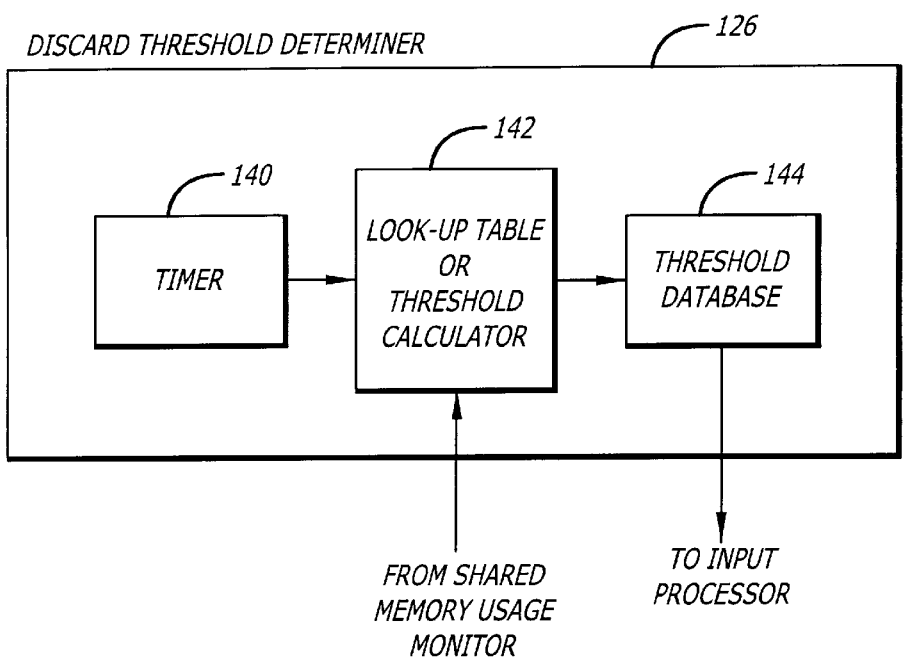
FIG. 8C illustrates an embodiment of the discard threshold determiner of FIG. 8A.

FIG. 8C illustrates an embodiment of discard threshold determiner 126. Determiner 126 includes a timer 140 for periodically generating a signal indicating that the threshold values should be updated. Block 142 updates the threshold values in response to the signal from timer 140 and stores the updated threshold values in threshold database 144. Threshold database 144 may be any type of register or storage device capable of storing threshold values. Additional details regarding timer 140 are provided below with respect to FIG. 11. Threshold database 144 stores threshold values associated with each address queue 104 in switch 100. Block 142 receives information regarding memory usage from shared memory usage monitor 128 (FIG. 8A). Block 142 performs the actual threshold calculations or determinations by using a look-up table or by calculating the new threshold values. Additional details regarding the look-up table and threshold calculations are provided below. The threshold values are then provided to discard determiner 132 in input processor 122.

Another embodiment of the invention updates the discard thresholds without using a timer. In this embodiment, discard determiner 132 (FIG. 8B) generates a request for all threshold values associated with a particular address queue. In response, discard threshold determiner 126 receives information regarding available memory and determines one or more threshold values using a look-up table or calculating the thresholds. This embodiment only determines the threshold values associated with a particular address queue, rather than determining threshold values associated with all address queues.

Data transmission protocols may include parameters associated with particular data cells indicating the discard priority of the data cell. A low priority data cell will be discarded before a high priority data cell is discarded. For example, in an ATM environment, a cell loss priority (CLP) bit is provided in the ATM cell header. If the CLP bit is set to 1, the ATM cell has a low discard priority. If the CLP bit is set to 0, the ATM cell has a high discard priority. Thus, cells having a CLP bit set to 1 are discarded before cells having a CLP bit set to 0.

Figure 9A:
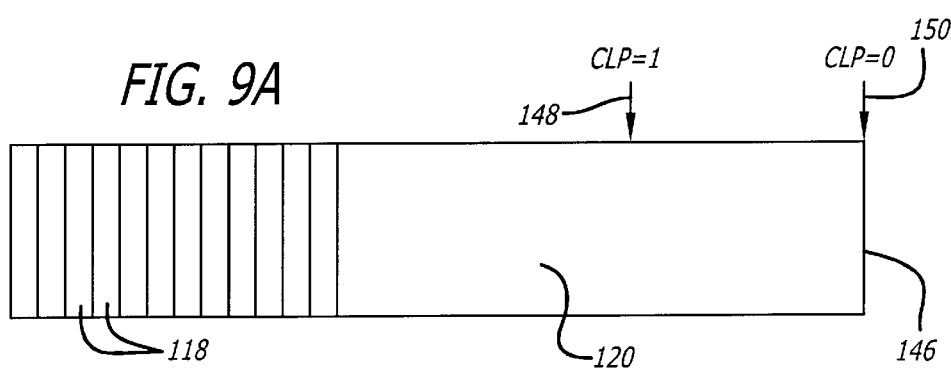
FIGS. 9A and 9B illustrates queues having multiple thresholds.

Referring to FIG. 9A, an address queue 146 contains a plurality of addresses 118 and an unused portion 120. Two different cell discard thresholds 148 and 150 are associated with address queue 146. Discard threshold 148 is associated with cells having a CLP bit set to 1 and discard threshold 150 is associated with cells having a CLP bit set to 0. As shown in FIG. 9A, threshold 150 is set higher than threshold 148. Thus, when discard threshold 148 has been reached, incoming data cells having CLP=1 will be discarded but incoming cells having CLP=0 will be accepted into the queue until discard threshold 150 is reached. As discussed above, both threshold values 148 and 150 are adjusted in response to changes in the usage of shared memory 102.

Figure 10A:
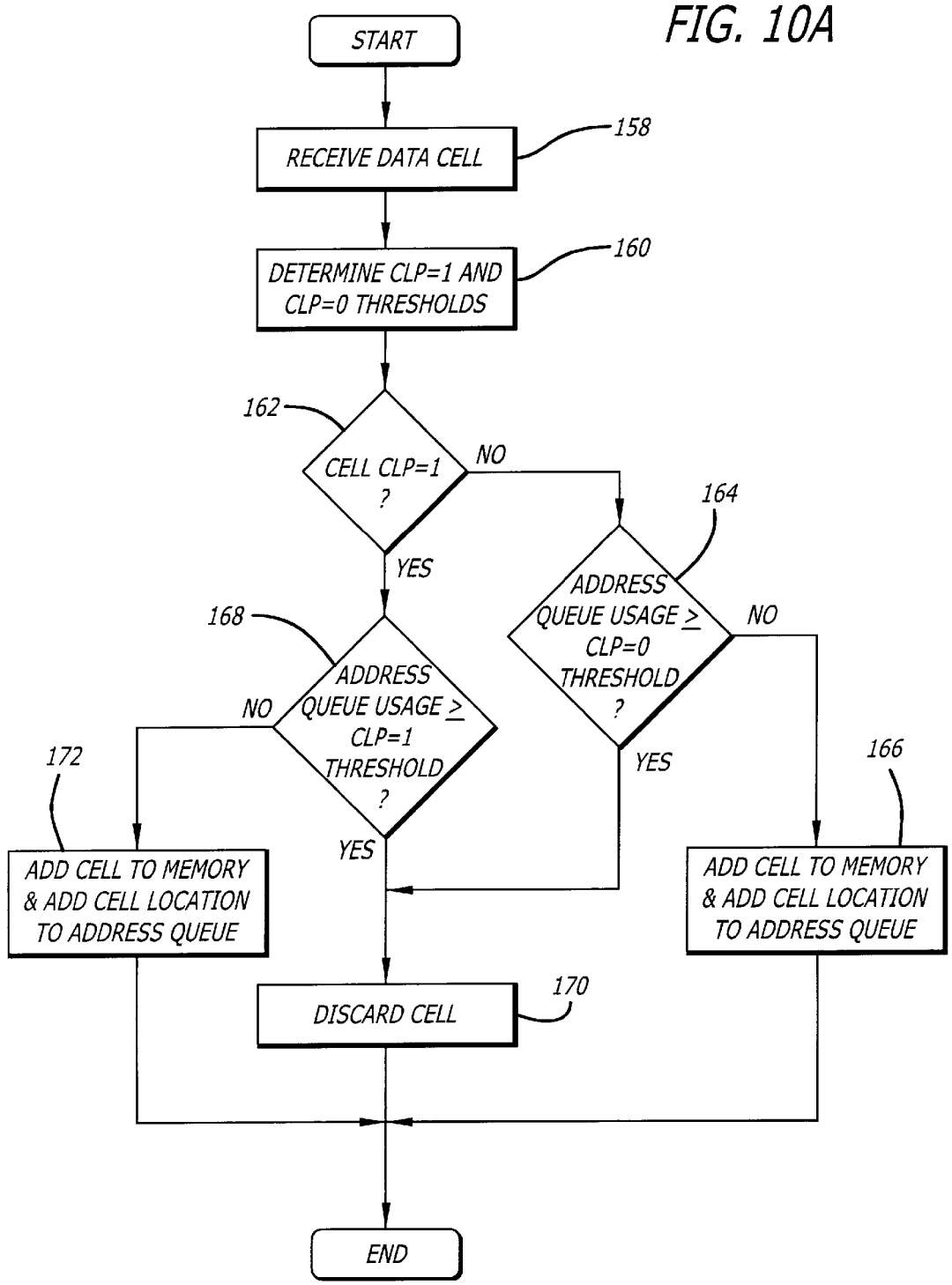
FIG. 10A is a flow diagram illustrating the cell discard operation according to an embodiment of the invention.

FIG. 10A is a flow diagram illustrating a procedure for discarding data cells associated with an address queue of the type shown in FIG. 9A. At step 158, a cell is received by an input port of the shared memory switch or other shared memory device. At step 160 the routine determines the threshold values associated with CLP=1 and CLP=0 data cells. At step 162, the routine determines whether CLP=1. If CLP≠1 (indicating that CLP=0), then the routine branches to step 164 to determine whether the current address queue usage exceeds or is equal to the CLP=0 threshold (e.g., discard threshold 150 in FIG. 9A). If the discard threshold has not been reached in step 164, then the routine branches to step 166 where the cell is added to shared memory 102 and the cell location is added to the appropriate address queue. Otherwise, the cell is discarded at step 170.

If CLP=1 at step 162, then the routine branches to step 168 to determine whether the current address queue usage exceeds or is equal to the CLP=1 threshold (e.g., discard threshold 148 in FIG. 9A). If the discard threshold has been reached in step 168, then the routine branches to step 170 where the cell is discarded. Otherwise, the cell is added to shared memory 102 and the cell location is added to the appropriate address queue at step 172.

Packet discard thresholds are used in a manner similar to the cell discard thresholds discussed above. When a packet discard threshold has been reached for a particular queue, any incoming data cells belonging to the same packet will be discarded in their entirety. The discarding of incoming data cells may continue to the end of the packet, even if the queue usage subsequently drops below the packet discard threshold. Packet discard threshold values are adjusted in response to changes in the usage of the shared memory resources. When discarding a data packet, if some of the data cells must be discarded, it is more efficient to discard cells belonging to the entire packet or AAL5 frame, rather than discarding cells belonging to a different packet. This avoids the transmission of corrupted packets and preserves both network bandwidth and memory resources. However, when using an AAL5 implementation, it is preferable to retain the last ATM cell containing the packet boundary information. Discarding the last ATM cell would cause the system to lose this boundary information.

Figure 9B:
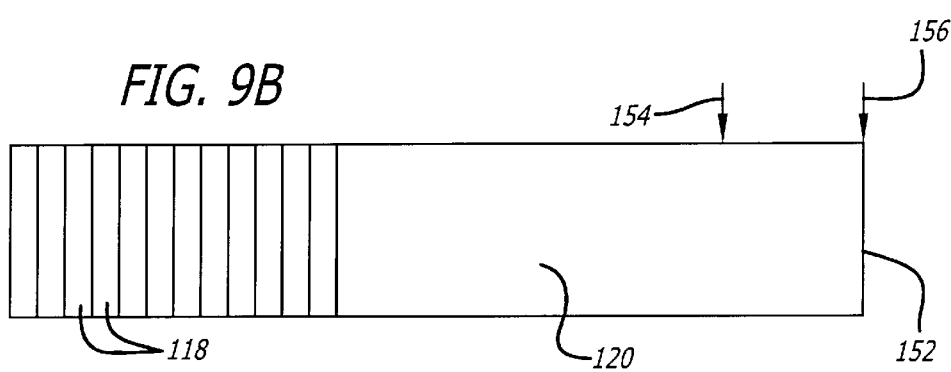

FIG. 9B illustrates an embodiment of the present invention using two different packet discard thresholds. An address queue 152 contains a plurality of addresses 118 and an unused portion 120. A first packet discard threshold 154 determines when to discard the data cells of an entire incoming packet. A second packet discard threshold 156, referred to as a partial packet discard threshold, determines when to discard an incoming data cell as well as the remaining data cells in the particular packet. When the partial packet discard threshold is reached, an incoming data cell is discarded and the data cells in the remainder of the packet are discarded, but the data cells already stored in the shared memory and added to the address queue are not discarded or deleted from the queue.

Figure 10B:
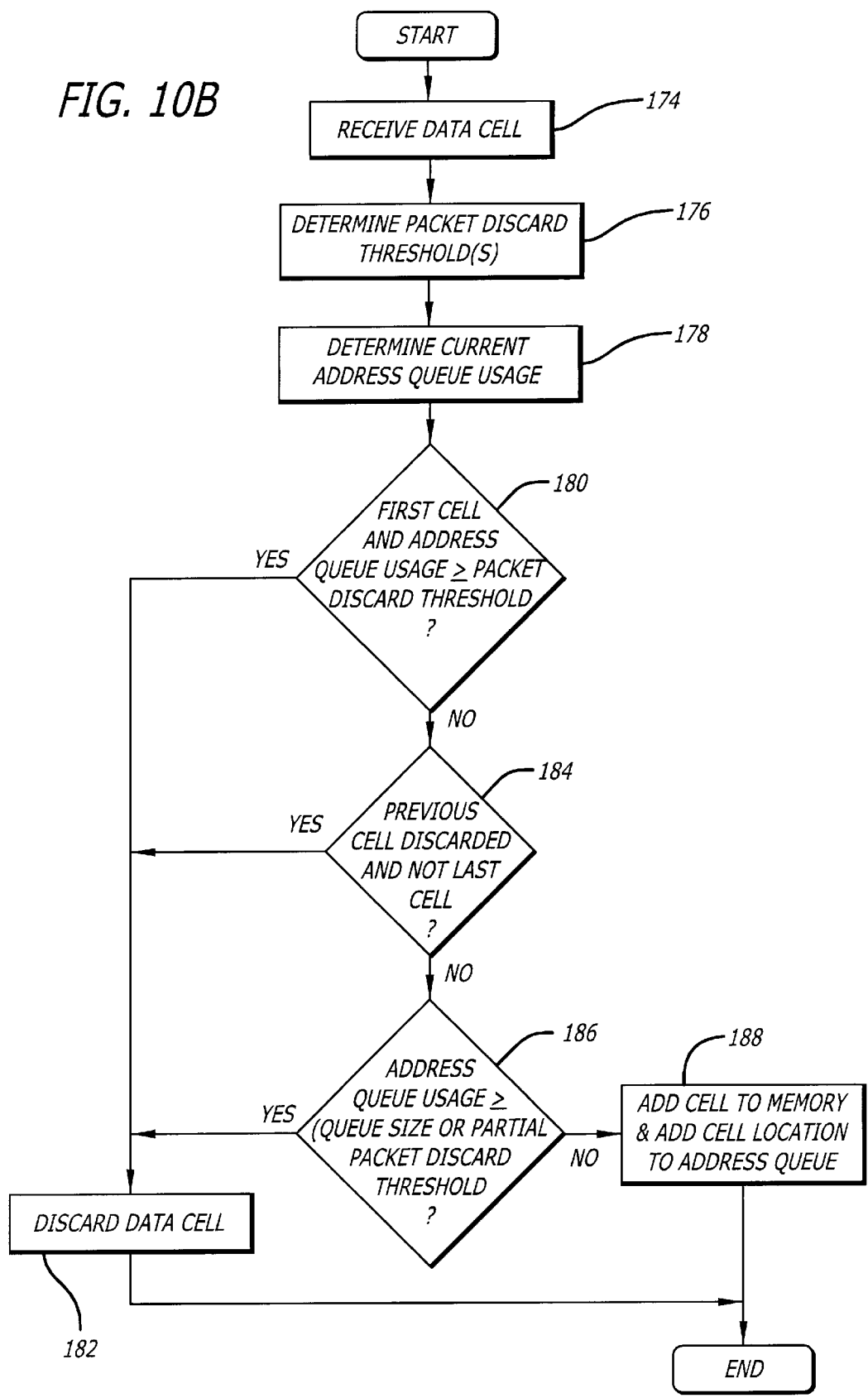
FIG. 10B is a flow diagram showing a procedure for discarding packets of data.

FIG. 10B illustrates a procedure for packet discard. As discussed above with reference to FIG. 9B, data cells of an entire packet may be discarded or cells of partial packets may be discarded. At step 174, a data cell is received by shared memory switch 100. A packet discard threshold is determined at step 176 and the current address queue usage is determined at step 178. Step 180 compares the current address queue usage with the packet discard threshold as well as determining whether the current cell is the first cell in the packet. If the current cell is the first cell in the packet and the address queue usage exceeds or equals the packet discard threshold, then the cell is discarded at step 182. Otherwise, step 180 branches to step 184 to determine whether the previous cell in the packet was discarded and whether or not the current cell is the last cell of the packet. Thus, if a previous cell of a packet was discarded, then all remaining cells in the packet will be discarded, except the last cell. As discussed above, if using AAL5 framing, it is desirable to retain the last cell which contains the packet boundary information.

If the previous cell was discarded and the current cell is not the last cell, then step 184 branches to step 182 where the current cell is discarded. If the previous cell was not discarded or the current cell is the last cell, then step 186 determines whether the current address queue usage exceeds or is equal to either the queue size or the partial packet discard threshold. If the queue size or the packet discard threshold is reached, then the current cell is discarded at step 182. If the current address queue usage does not exceed either the queue size or the partial packet discard threshold, then the current cell is stored in shared memory 102 and its location is added to the appropriate address queue at step 188.

Figure 11:
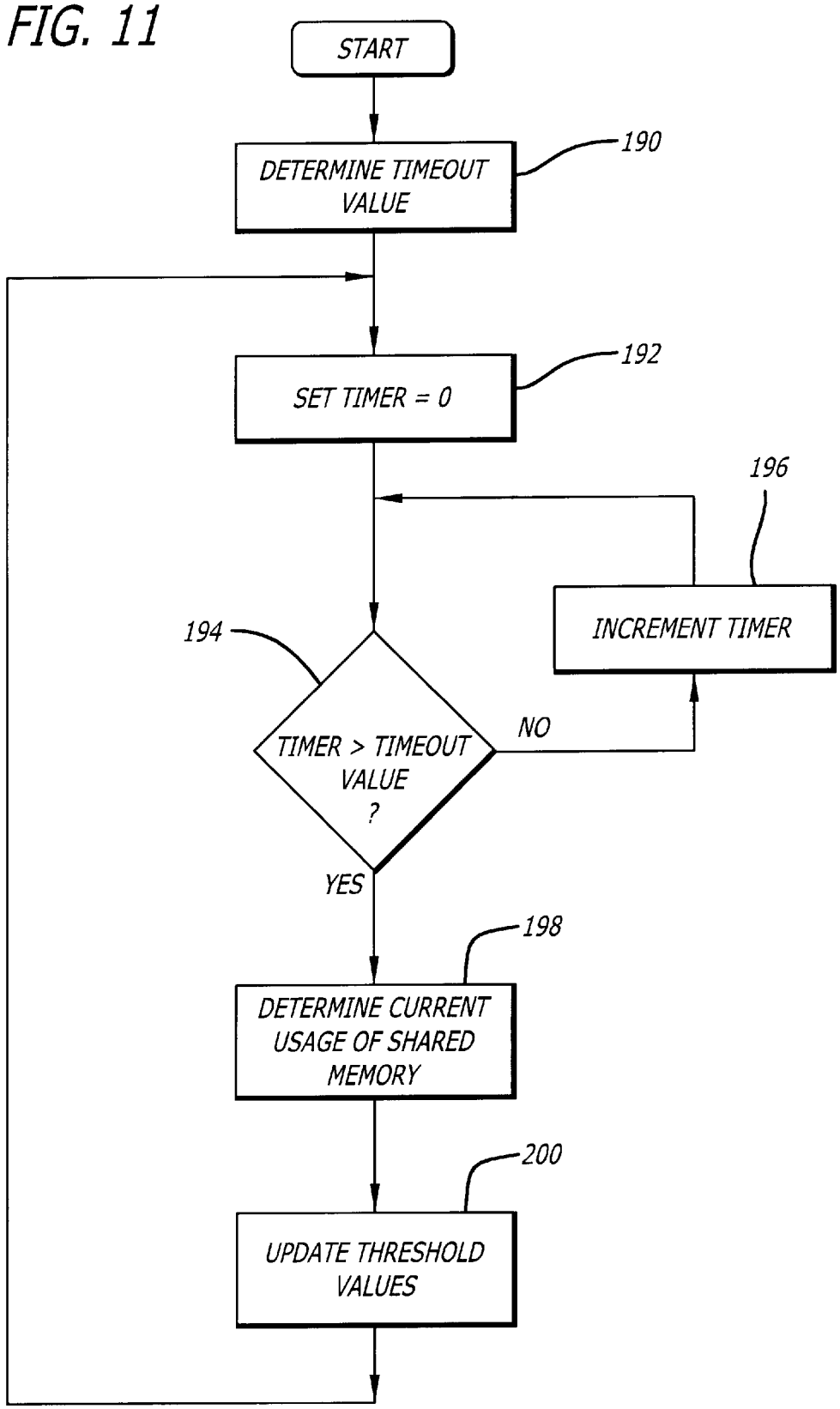
FIG. 11 is a flow diagram illustrating the operation of a timer for updating threshold values.

Referring to FIG. 11, a flow diagram illustrates the operation of timer 140 (FIG. 8C) for periodically updating discard threshold values. At periodic intervals, determined by a timeout value, the current usage of shared memory 102 is sampled or monitored. The timeout value is determined at step 190 and the timer is reset at step 192. At step 194, the current value of the timer is compared with the timeout value. If the timeout value has not been exceeded, then the timer is incremented at step 196 and the routine returns to step 194. If the timer exceeds the timeout value at step 194, then the routine branches to step 198 where the current usage of shared memory 102 is determined. Based on the current memory usage, the discard threshold values are updated as necessary. The threshold values may be updated using a look-up table or by calculating new threshold values.

One embodiment of the present invention adjusts threshold values based on discrete categories stored in a look-up table. Table 1 is an example of a look-up table for determining threshold values based on global memory usage.

TABLE 1

| Global Memory Usage | CLP = 1 Threshold | Packet Discard Threshold |
|---|---|---|
| low | very high | high |
| medium | high | medium |
| high | medium | low |
| very high | low | low |

The first column of Table 1 indicates the global memory usage; i.e., what portion of the shared memory is currently being used to store data cells. Under low memory usage conditions, a large portion of shared memory is available for storing incoming data cells. In this situation, the CLP=1 threshold and packet discard threshold may be set relatively high. This situation is similar to that represented in FIGS. 5A and 5B. As the global memory usage increases, the threshold values are reduced, as illustrated in Table 1.

Using a look-up table such as Table 1, threshold values are adjusted by determining the current memory usage and setting the threshold values to the corresponding value in the table. Table 1 identifies threshold values and memory usage values as "very high", "high", "medium" or "low." The actual discrete values stored in a look-up table may be numeric values or a range of values. For example, "low" memory usage may be represented as any memory usage below 25%. "Medium" memory usage may be represented as 25–50% usage, "high" as 50–75% usage, and "very high" as 75–100% usage.

Similarly, threshold levels may be represented as percentages of the total queue capacity. For example, a "high" threshold may be represented as 85% of the queue capacity and a "low" threshold may be 45% of the queue capacity. Those skilled in the art will appreciate that the actual values used for memory usage and the thresholds will vary based on the number of queues, network requirements, and queue priority. The number of rows in the look-up table may be increased to provide additional levels of memory usage. For example, eight different memory usage ranges may be used to provide a gradual change of the threshold values as shared memory usage changes.

The number of columns in the look-up table may be increased to represent the queues associated with each port and the discard thresholds associated with each queue. For example, a particular output port may have two queues, one for UBR data and another for ABR data. Each queue in this example has two different discard thresholds, one for packet discard and another for partial packet discard. Therefore, the look-up table must have four columns to represent two discard thresholds associated with each queue. An exemplary look-up table for this situation is illustrated in Table 2.

TABLE 2

| Global Memory Usage | Queue 1 Partial Packet Discard | Queue 1 Packet Discard | Queue 2 Partial Packet Discard | Queue 2 Packet Discard |
|---|---|---|---|---|
| 0–25% | 100% | 80% | 100% | 80% |
| 25-50% | 80% | 60% | 80% | 60% |
| 50-75% | 65% | 50% | 65% | 50% |
| 75-100% | 50% | 40% | 50% | 40% |

Table 2 illustrates four different levels of global memory usage for determining the appropriate threshold values. In this example, both queues are equally weighted and contain identical threshold values for the same packet discard threshold value at the same memory usage level. Alternatively, the queues may receive unequal weighting and different threshold values. The threshold values selected in Table 2 represent one possible set of values. Those skilled in the art will appreciate that various threshold values may be selected based on queue priority, data types, anticipated traffic flow, and other factors.

When the number of queues associated with each output port is large, a look-up table may not be feasible. For example, cells of computer data packets may be queued on a per Virtual Connection (per VC) basis, referred to as per VC queuing. In this situation, each VC has a separate queue for isolating traffic. Instead of providing a look-up table, threshold values may be determined using a calculation procedure. A formula for calculating threshold values is expressed as follows:

$$Th_j(i) = (\text{Free Memory}) \cdot F_j(i) + C_j(i)$$

Where i indicates a particular queue and j indicates a particular discard threshold associated with queue i. For example, $Th_1(2)$ represents the first discard threshold value associated with the second queue. Free Memory represents the number of available memory buffers in shared memory 102. The value of Free Memory is determined by shared memory usage monitor 128 (FIG. 8A). $F_j(i)$ represents the portion of shared memory 102 allocated to queue i using threshold j. $C_j(i)$ is a constant bias value providing a guaranteed minimum memory allocation for queue i and threshold j.

Both $F_j(i)$ and $C_j(i)$ are configurable parameters and may be set or determined during initialization of switch 100. Either parameter may be set to zero. For example, for a constant bit rate (CBR) cell queue, parameter F may be set to zero and parameter C set to a fixed number of cells (e.g., 200 cells) or a fixed percentage of the shared memory (e.g., 10%). The value of parameter C is dependent on the delay and loss requirements of the queue as well as the bandwidth allocated to the queue. In this situation, the threshold will be constant since the term (Free Memory)·$F_j(i)$ is zero, resulting in the equation $Th_j(i)=C_j(i)$. Therefore, the CBR queue allocation will not change in response to changes in the number of available memory buffers.

For an unspecified bit rate (UBR) cell queue, parameter C may be set to zero to allow dynamic sharing of the memory resources. Thus, the UBR discard thresholds will be determined using the equation $$Th_j(i)=(\text{Free Memory})\cdot F_j(i).$$

For an available bit rate (ABR) cell queue, both parameters F and C may be non-zero to allow both guaranteed and dynamic allocation of the memory resources. Depending on the allocation desired, the values of F and C may be set to various values. For example, assume F is set to 1/N (where N is the number of queues sharing the memory resources), and C is set to 1/N. In this example, each queue is guaranteed 1/N of the total memory resources and permitted to share up to 1/N of the free memory.

In another example, assume that N queues share the memory resources and each queue has a single threshold. If F=1 and C=0 for all N queues, then the shared memory will be allocated equally among all queues. In this example, a single queue is permitted to use the entire shared memory when there are no cells stored in the memory. When memory usage increases to 50%, each queue may only use up to 50% of the total memory.

Figure 12:
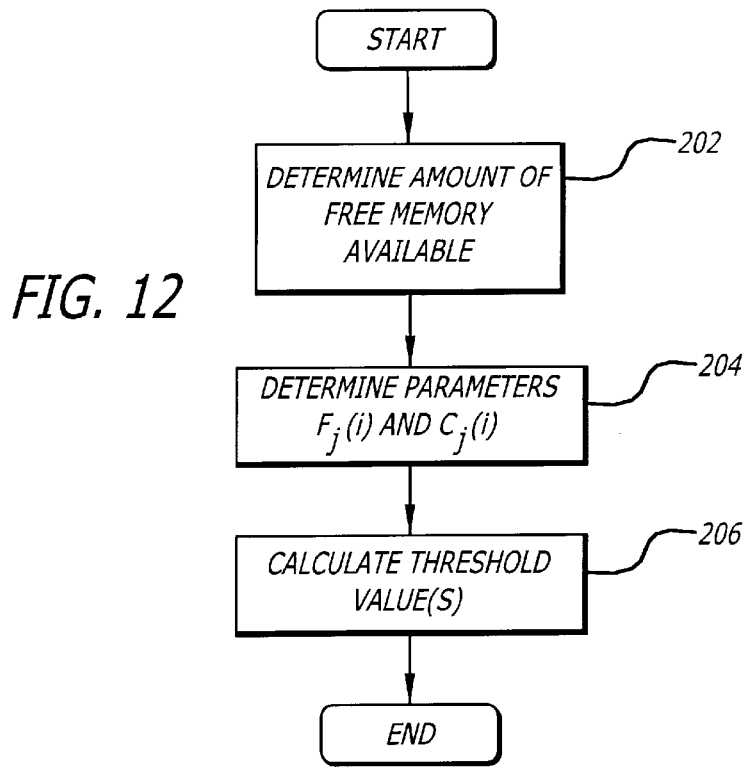
FIG. 12 is a flow diagram showing the procedure used to calculate threshold values.

FIG. 12 is a flow diagram illustrating the procedure used to calculate threshold values. At step 202, the amount of free memory available is determined by shared memory usage monitor 126 (FIG. 8A). At step 204, the parameters $F_j(i)$ and $C_j(i)$ are determined for each threshold associated with each queue. The values for parameters F and C may be established during initialization of switch 100. Parameters F and C may be stored in registers or any other storage location within switch 100. At step 206, discard threshold values are calculated using the formula discussed above. Threshold values may be stored in threshold database 144 (FIG. 8C) or any other storage location in switch 100. As discussed above, threshold values may be updated periodically using a timer or updated on an as-needed basis; i.e., updating threshold values for a particular queue when a data cell destined for the queue is received. The steps illustrated in FIG. 12 may be used to update threshold values using either periodic updating or as-needed updating.

Figure 13:
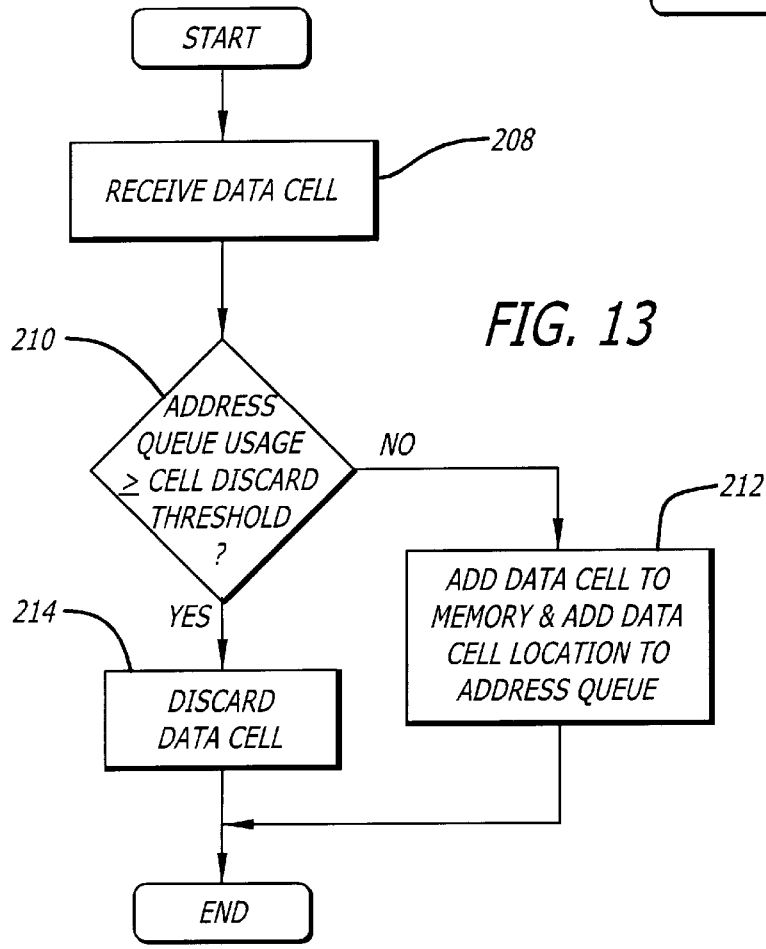
FIG. 13 illustrates the operation of an embodiment of the invention using a single discard threshold for each queue.

Referring to FIG. 13, a flow diagram illustrates the operation of an embodiment of the present invention using a single cell discard threshold for each queue. At step 208, a data cell is received at an input port. Step 210 determines whether the address queue usage of the data cell's destination queue has reached or exceeded the cell discard threshold associated with the destination queue. If the cell discard threshold has been reached or exceeded, then the data cell is discarded at step 214. If the cell discard threshold has not been reached, then the data cell is added to the shared memory and the data cell's address is added to the appropriate address queue.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method for allocating shared memory resources among a plurality of queues, said method comprising:

monitoring said shared memory resources to determine a number of available memory buffers;

generating a threshold value for each queue, each threshold value indicating a number of data cells to be stored in said queue;

updating said threshold values in response to changes in said number of available memory buffers;

generating a packet discard threshold; and discarding at least one data cell of an incoming packet destined for a queue of said plurality of queues if usage if said queue exceeds said packet discard threshold with exception to a last data cell of said packet having a format in accordance with Asynchronous Transfer Mode Adaptation Layer (AAL) type framing.

2. The method of claim 1, wherein prior to discarding said at least one data cell, comparing said threshold value for the queue is compared to usage of said queue.

3. The method of claim 2 wherein said at least one data cell is added to an appropriate queue if said queue usage does not exceed said packet discard threshold value.

4. The method of claim 1 wherein the updating said threshold values includes increasing said threshold values in response to increased available memory and decreasing said threshold values in response to decreased available memory.

5. A method for allocating shared memory resources among a plurality queues, said method comprising:

monitoring said shared memory resources to determine a number of available memory buffers;

generating a first threshold value and a second threshold value, said first threshold value indicating when to discard data cells of an entire incoming packet and said second threshold value indicating when to discard an incoming data cell and remainder data cells of said incoming packet; and updating said threshold values in response to changes in said numbers available memory buffers.

6. The method of claim 5 wherein said first threshold value is associated with a first data priority and said second threshold value is associated with a second data priority.

7. A method for adaptively discarding data cells received by a device having shared memory resources, said method comprising:

receiving a data cell having an associated data loss priority, wherein said data cell is destined for a particular queue;

generating a threshold value associated with said destination queue, said threshold value corresponding to said data loss priority and said available memory resources;

discarding said data cell if said threshold value for said queue has been exceeded;

adding said data cell to said destination queue if said threshold value for said queue has not been exceeded; and generating a packet discard threshold associated with each queue using a look-up table having predetermined threshold values associated with various levels of said available memory resources.

8. The method of claim 7 wherein said threshold value for a particular queue is determined using a look-up table having predetermined threshold values associated with various levels of available memory resources.

9. The method of claim 7 wherein said threshold value for a particular queue is determined using a calculation having predetermined parameters associated with various levels of available memory resources.

10. The method of claim 7 wherein the step of generating a threshold value includes generating a first threshold value and a second threshold value for each queue, said first threshold value associated with a first data loss priority and said second threshold value associated with a second data loss priority.

11. The method of claim 7 wherein said threshold values are increased in response to increased available memory resources and said threshold values are decreased in response to decreased available memory resources.

12. A shared memory switch comprising:
    a plurality of inputs, each input coupled to receive a plurality of data cells;
    a shared memory coupled to said plurality of inputs;
    a plurality of address queues coupled to said shared memory, said plurality of address queues coupled to receive a plurality of addresses;
    a plurality of outputs, each output associated with at least one address queue; and
    an adaptive discard mechanism coupled to said shared memory and said inputs, said adaptive discard mechanism to generate a packet discard threshold and to discard at least one of said plurality of data cells associated with an incoming packet destined for address queue of said plurality of address queues if usage of said address queue exceeds said packet discard threshold with exception to a last data cell of said incoming jacket having a format in accordance with Asynchronous Transfer Mode Adaptation Layer (AAL) type framing.

13. The shared memory switch of claim 12 wherein said adaptive discard mechanism accepts or discards at least one of said plurality of data cells in response to usage of said shared memory.

14. The shared memory switch of claim 12 wherein said adaptive discard mechanism generates a threshold value associated with each address queue.

15. The shared memory switch of claim 14 wherein said at least one of said plurality of data cells are discarded by said adaptive discard mechanism if address queue usage exceeds said packet discard threshold.

16. A shared memory device having a plurality of inputs and a plurality of outputs comprising:
    a shared memory coupled to said inputs and said outputs;
    a queue associated with each of said outputs;
    means for determining usage of said shared memory;
    means for determining usage of each queue; and
    means for determining an adaptive discard threshold associated with each queue, said adaptive discard threshold indicating whether to discard an incoming data cell except when the incoming data cell is a last data cell of said incoming packet having a format in accordance with Asynchronous Transfer Mode Adaptation Layer (AAL) type framing.

17. The shared memory device of claim 16 further including means for discarding said incoming data cell if said queue usage exceeds said associated adaptive discard threshold.

* * * * *